United States Patent Office 2,835,674
Patented May 20, 1958

2,835,674

PROCESS OF PREPARING DERIVATIVES OF 1.4.5.8-NAPHTHALENE-TETRACARBOXYLIC ACID

Wilhelm Eckert and Otto Fuchs, Frankfurt am Main, Germany, assignors to Farbwerke Hoechst Aktiengesellschaft vormals Meister Lucius & Bruning, Frankfurt am Main, Germany, a corporation of Germany No Drawing. Application March 25, 1955
Serial No. 496,921

Claims priority, application Germany March 31, 1954

3 Claims. (Cl. 260—281)

The present invention relates to an improved process of preparing derivatives of 1.4.5.8-naphthalene-tetracarboxylic acid.

According to the statements made in German Patent No. 553,629 naphthoylene-arylimideazole-peri-dicarboxylic acids which correspond to the following general formula:

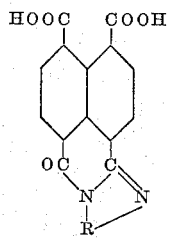

in which R represents an aryl radical, can be obtained by dissolving 1.4.5.8-naphthalene-tetracarboxylic acid or its anhydride in such an amount of hot sodium carbonate or potassium carbonate solution as is necessary for the neutralization of two carboxylic acid groups, adding an ortho-diamine to the solution so obtained and then boiling it for some hours. The solution is then freed by filtration from a by-product which is insoluble in alkalies, rendered acid to delta-paper with dilute hydrochloric acid at boiling temperature, the precipitate is filtered off with suction, washed with water and then dried.

When duplicating repeatedly the examples disclosed in the above patent specification, it has been found that, depending on the kind of the ortho-diamine used, pure naphthoylene-arylimideazole-peri-dicarboxylic acids are only obtained in a yield of 50 percent to 70 percent of the theoretical, which is not sufficient to warrant an economic production of these intermediate products to be used in the manufacture of dyestuffs.

Now we have found that 1.4.5.8-naphthalene-tetracarboxylic acid or its anhydride can semilaterally be condensed with an ortho-diamine in a practically quantitative yield by working under such conditions that the reaction does not proceed to the stage of naphthoylene-arylimideazole-peri-dicarboxylic acids or their sodium salts but is already stopped with the formation of the sparingly soluble mono-sodium salts of the N-substituted naphthalamide-1.8-dicarboxylic acids which correspond to the following general formula:

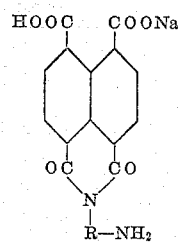

in which R represents an aryl radical and the amino group stands in ortho-position to the nitrogen atom.

In order to perform a practically quantitative semi-lateral condensation, the following conditions must be observed:

The condensation must be effected at a constant pH-value of 5.0 to 5.8. This pH-value is adjusted by the addition of buffer substances. As buffer substances suitable for this purpose, there come into consideration salts of inorganic or organic acids, such as alkali phosphates and alkali acetates, and alkali borates.

Moreover, at the pH-range indicated above such a high salt concentration in the solution must be selected that the resulting mono-sodium salt, which is sparingly soluble in the present salt solution, can crystallize.

Depending on the ortho-diamine used, the condensation is conducted at a temperature between about 50° C. and about 90° C.

As ortho-diamines there come into consideration, for example: 1.2-diaminobenzene, 1.2-diamino-toluenes, 1.2-diamino-xylenes, 1.2-diamino-halogenbenzenes, 1.2-diamino-hydroxy- or alkoxybenzenes, 1.2-diamino-benzotrifluorides, 1.2-diamino-aceto- or benzophenones, 1.2- or 2.3-diamino-naphthalenes, 1.2- or 2.3-diamino-5.6.7.8-tetrahydro-naphthalenes and 1.2- or 2.3-diamino-anthraquinones.

The mono-sodium salt can be readily isolated. Sometimes it contains a small amount (up to 1 percent) of a by-product which is insoluble in alkalies. After the precipitate has been dissolved in an alkali and the solution has been freed from the by-product by filtration, the free N-substituted naphthalimide-1.8-dicarboxylic acids are precipitated in the cold with the aid of a dilute acid; they can readily be transformed into the naphthoylene-arylimideazole-peri-dicarboxylic acids or their anhydrides by precipitating them at boiling temperature and boiling the suspension. The products so obtained are free from 1.4.5.8-naphthalene-tetracarboxylic acid and can be used for further condensing reactions without being purified.

The new process constitutes a valuable advance in the art, since it can be conducted in a nearly quantitative yield with the application of all accessible ortho-diamines.

The derivatives of 1.4.5.8-naphthalene-tetracarboxylic acid obtainable by the present invention are valuable intermediates for the manufacture of dyestuffs.

The following examples serve to illustrate the invention, but they are not intended to limit it thereto, the parts being by weight unless otherwise stated and the relationship of parts by weight to parts by volume being the same as that of the kilogram to the liter:

*Example 1*

300 parts of 1.4.5.8-naphthalene-tetracarboxylic acid are dissolved in a hot solution of 2000 parts of crystallized sodium acetate in 9000 parts by volume of water. 130 parts of 1.2-diaminobenzene are then added and the solution so obtained is stirred at 75° C. After a short time, the separation of fine light yellow prisms begins and is complete after about 8–10 hours. After cooling, the precipitate is filtered off with suction and the resulting mono-sodium salt of N-(2'-aminophenyl)-naphthalimide-1.8-dicarboxylic acid is washed with a 10 percent sodium chloride solution. To purify and transform the moist press cake into the free acid, it is suspended in 3000 parts by volume of water, dissolved by the addition of a sodium carbonate solution, the solution is filtered and precipitated in the cold with dilute hydrochloric acid. The free acid is filtered off with suction, washed with water and dried.

In order to transform the product so obtained into the naphthoylene-benzimideazole-1.8-dicarboxylic acid, it is dissolved in 3000 parts by volume of hot water, while adding sodium carbonate, precipitated at boiling temperature with hydrochloric acid and boiled for some time. After cooling, the product so obtained is filtered off with suction, washed with water and dried. The yield is quantitative.

The mono-sodium salt of N-(2'-aminophenyl)-naphthalimide-1.8-dicarboxylic acid can advantageously be transformed into naphthoylene-benzimideazole-1.8-dicarboxylic acid or its anhydride without isolating the free acid, by treating the said salt at elevated temperature with a mineral acid; the yield is likewise quantitative.

The naphthoylene-benzimideazole-1.8-dicarboxylic acid or its anhydride is an orange powder which dissolves in alkalies to a yellow solution.

*Example 2*

30 parts of 1.4.5.8-naphthalene-tetracarboxylic acid, 286 parts of borax and 500 parts of primary sodium phosphate are dissolved in 800 parts by volume of hot water. 14 parts of 1.2-diaminobenzene are then added and the solution so obtained is stirred for 6 hours at 75° C. The product is then worked up as described in Example 1.

The yield of naphthoylene-benzimideazole-1.8-dicarboxylic acid or its anhydride is nearly quantitative.

*Example 3*

200 parts of 1.4.5.8-naphthalene-tetracarboxylic acid are dissolved in a hot solution of 650 parts of crystallized sodium acetate in 6000 parts by volume of water. 110 parts of 1.2-diamino-4-chlorobenzene are then added and the solution so obtained is stirred at 80° C. After 1–2 hours, 350 parts of sodium chloride are added. Stirring is continued for a further 8–10 hours at 80° C.; the mixture is then allowed to cool, filtered off with suction, the precipitate is washed with a 10 percent sodium chloride solution and worked up as described in Example 1. By precipitation with dilute hydrochloric acid at boiling temperature and boiling the suspension as described in Example 1, the compound is readily transformed into naphthoylene - 4 - chloro-benzimideazole - 1.8 - dicarboxylic acid or its anhydride.

*Example 4*

88 parts of 1.2-diamino-4.5-dichlorobenzene are added to a solution of 122 parts of 1.4.5.8-naphthalene-tetracarboxylic acid and 800 parts of crystallized sodium acetate in 4800 parts by volume of water, and the solution so obtained is stirred for 12 hours at 80–85° C. After cooling, the precipitate is filtered off with suction and the press cake so obtained is worked up as described in Example 1.

The yield of naphthoylene-4.5-dichloro-benzimideazole-1.8-dicarboxylic acid or its anhydride is nearly quantitative.

*Example 5*

30 parts of 1.4.5.8-naphthalene-tetracarboxylic acid are dissolved in a hot solution of 400 parts of primary sodium phosphate and 268 parts of secondary sodium phosphate in 1100 parts by volume of water. 14.5 parts of 1.2-diamino-4-methylbenzene are then added and the solution so obtained is stirred for 4 hours at 65°–70° C. The product is then worked up as described in Example 1.

The yield of naphthoylene-4-methyl-benzimideazole-1.8-dicarboxylic acid or its anhydride is nearly quantitative.

*Example 6*

60 parts of 1.4.5.8-naphthalene-tetracarboxylic acid, 800 parts of primary sodium phosphate and 536 parts of secondary sodium phosphate are dissolved in 1100 parts by volume of hot water. 36 parts of 1.2-diamino-4-ethoxybenzene are added to the solution so obtained and the mixture is heated for 10 hours at 65° C. It is then worked up as described in Example 1.

The yield of naphthoylene-4-ethoxy-benzimideazole-1.8-dicarboxylic acid or its anhydride amounts to about 95 percent of the theoretical.

We claim:

1. A process of preparing derivatives of 1.4.5.8-naphthalene-tetracarboxylic acid which comprises condensing at a temperature between about 50° C. and about 90° C. a compound selected from the group consisting of 1.4.5.8-naphthalene-tetracarboxylic acid and its anhydride in a pH-range of 5.0 to 5.8 in the presence of buffer substances selected from the group consisting of alkali phosphates, alkali acetates and alkali borates with an aromatic ortho-diamine selected from the group consisting of 1.2-diamino-benzene, 1.2-diamino-toluenes, 1.2-diamino-xylenes, 1.2-diamino-halogenbenzenes, 1.2-diamino-hydroxy- and alkoxybenzenes, 1.2-diamino-benzotrifluorides, 1.2-diamino-aceto- and benzophenones, 1.2- and 2.3-diamino-naphthalenes, 1.2- and 2.3-diamino-5.6.7.8-tetrahydro-naphthalenes, 1.2- and 2.3-diamino-anthraquinones in an aqueous solution which has such a high salt concentration that the resulting sparingly soluble mono-sodium salt can crystallize, and transforming the mono-sodium salts of N-substituted naphthalimide-1.8-dicarboxylic acids so obtained into compounds selected from the group consisting of naphthoylene-arylimidazole-1.8-dicarboxylic acids and their anhydrides by heating with mineral acids.

2. A process of preparing a derivative of 1.4.5.8-naphthalene-tetracarboxylic acid which comprises condensing at a temperature between about 50° C. and about 90° C. a compound selected from the group consisting of 1.4.5.8-naphthalene-tetracarboxylic acid and its anhydride in a pH-range of 5.0 to 5.8 in the presence of sodium acetate with 1.2-diaminobenzene in an aqueous solution which has such a high salt concentration that the resulting sparingly soluble mono-sodium salt can crystallize, and transforming the mono-sodium salt of N-(2'-aminophenyl)-naphthalimide-1.8-dicarboxylic acid so obtained into a compound selected from the group consisting of naphthoylene-benzimidazole-1.8-dicarboxylic acid and its anhydride by heating with a mineral acid.

3. A process of preparing a derivative of 1.4.5.8-naphthalene-tetracarboxylic acid which comprises condensing at a temperature between about 50° C. and about 90° C. a compound selected from the group consisting of 1.4.5.8-naphthalene-tetracarboxylic acid and its anhydride in a pH-range of 5.0 to 5.8 in the presence of sodium acetate with 1.2-diamino-4-chlorobenzene in an aqueous solution which has such a high salt concentration that the resulting sparingly soluble mono-sodium salt can crystallize, and transforming the mono-sodium salt of N - (2' - amino - 4' - chlorophenyl) - naphthalimide - 1.8 - dicarboxylic acid so obtained into a compound selected from the group consisting of naphthoylene-4-chlorobenzimidazole-1.8-dicarboxylic acid and its anhydride by heating with a mineral acid.

References Cited in the file of this patent

UNITED STATES PATENTS 1,924,090    Eckert et al. _____ Aug. 29, 1933